(12) United States Patent
Krstulich

(10) Patent No.: US 7,675,873 B2
(45) Date of Patent: Mar. 9, 2010

(54) ENHANCED IP-VOICE CONFERENCING

(75) Inventor: Zlatko Krstulich, Ottawa (CA)

(73) Assignee: Alcatel Lucent, Paris (FR)

( * ) Notice: Subject to any disclaimer, the term of this patent is extended or adjusted under 35 U.S.C. 154(b) by 1251 days.

(21) Appl. No.: 11/010,332

(22) Filed: Dec. 14, 2004

(65) Prior Publication Data

US 2006/0126538 A1 Jun. 15, 2006

(51) Int. Cl.
*H04L 12/66* (2006.01)
(52) U.S. Cl. .............................. 370/260; 379/372
(58) Field of Classification Search ......... 370/260–263, 370/266, 62; 348/14.08–14.1; 455/416; 379/93.21, 158, 202.01, 205.01, 202, 205
See application file for complete search history.

(56) References Cited

U.S. PATENT DOCUMENTS

2003/0128830 A1 7/2003 Coffman et al.
2004/0213402 A1* 10/2004 Ruetschi ................ 379/388.06
2005/0094792 A1* 5/2005 Berthoud et al. ....... 379/202.01
2005/0180582 A1 8/2005 Guedalia
2006/0023061 A1* 2/2006 Vaszary et al. ........... 348/14.08

FOREIGN PATENT DOCUMENTS

WO WO 02-28075 A3 4/2002

* cited by examiner

*Primary Examiner*—Fan Tsang
*Assistant Examiner*—Akelaw A Teshale
(74) *Attorney, Agent, or Firm*—Kramer & Amado, PC

(57) ABSTRACT

A system and method are provided for providing users of voice conferencing with indications of the quality perceived by other users of the voice conferencing system. A voice conferencing bridge measures the quality of the each user's channel, and provides real-time feedback to users whose channel quality is inadequate and that other users cannot hear them clearly. The feedback may be in the form of in-band or out-of-band signals, indicating for example that the user should speak louder, should mute while off-line, or warning the user that his or her channel may be muted automatically. The last option is particularly useful if a participant has temporarily left the conference and is playing music or hold tones while absent.

18 Claims, 2 Drawing Sheets

ENHANCED IP-VOICE CONFERENCING

FIELD OF THE INVENTION

The invention relates to voice conferencing, and more particular to real-time feedback of perceived speech quality during voice conferencing.

BACKGROUND OF THE INVENTION

A common problem in voice-conferencing is poor call quality. If a caller is not speaking clearly or loudly enough for other participants to hear the caller clearly, the other participants or a bridge organizer must interrupt the caller to ask him or her to speak more loudly. If there is interfering background noise coming from the a caller's end of the bridge, that participant must be identified by the other participants and asked to correct the problem, resulting again in interruptions to the voice conference. If a caller leaves the room and places the voice conference call on mute, hold tones or even music may be inadvertently injected into the voice conference. Attempting correction of the problem, or even simply tolerating these situations interferes with the voice conference, leading to frustration by the participants, wasted conference time, and reduced intelligibility.

A system which allowed voice conference participants to be automatically made aware of poor quality of their individual inputs would allow clearer and more enjoyable voice conferencing without the need for constant interruptions by other participants.

SUMMARY OF THE INVENTION

In accordance with one aspect of the invention, a method is provided for providing feedback to an end user device of a voice conference. A quality of an input signal received from the end user device at a bridge function is measured. A notification signal is provided to the end user device indicative of the quality of the input signal. An indication of the quality of the signal is displayed at the end user device. In one embodiment, it is determined whether the input signal includes unwanted content, and if the input signal includes unwanted content then the input signal is muted.

In accordance with another aspect of the invention, a method is provided for providing feedback to an end user device of a voice conference. The quality of an input signal received from the end user device at a bridge function is measured. It is determined whether the quality of the input signal is unacceptable by comparing the quality with configured thresholds. If the quality of the input signal is unacceptable, a notification signal is provided to the end user device indicative of the quality of the input signal.

The methods may be stored as instructions stored on a computer-readable medium for execution by a processor.

The methods and apparatus of the invention allow more effective voice conferencing. By providing real-time automated feedback of individual input quality to a caller responsible for the poor quality input, the caller can correct the problem without forcing other participants to interrupt the ongoing conference call. The feedback is discrete in that it is provided only to the offending user, and non-intrusive in that the feedback signals do not interrupt the voice conference. The caller causing the poor quality input may also be muted automatically, in order to remove annoying hold tones or hold music that interferes with effective participation in the conference call by other users.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
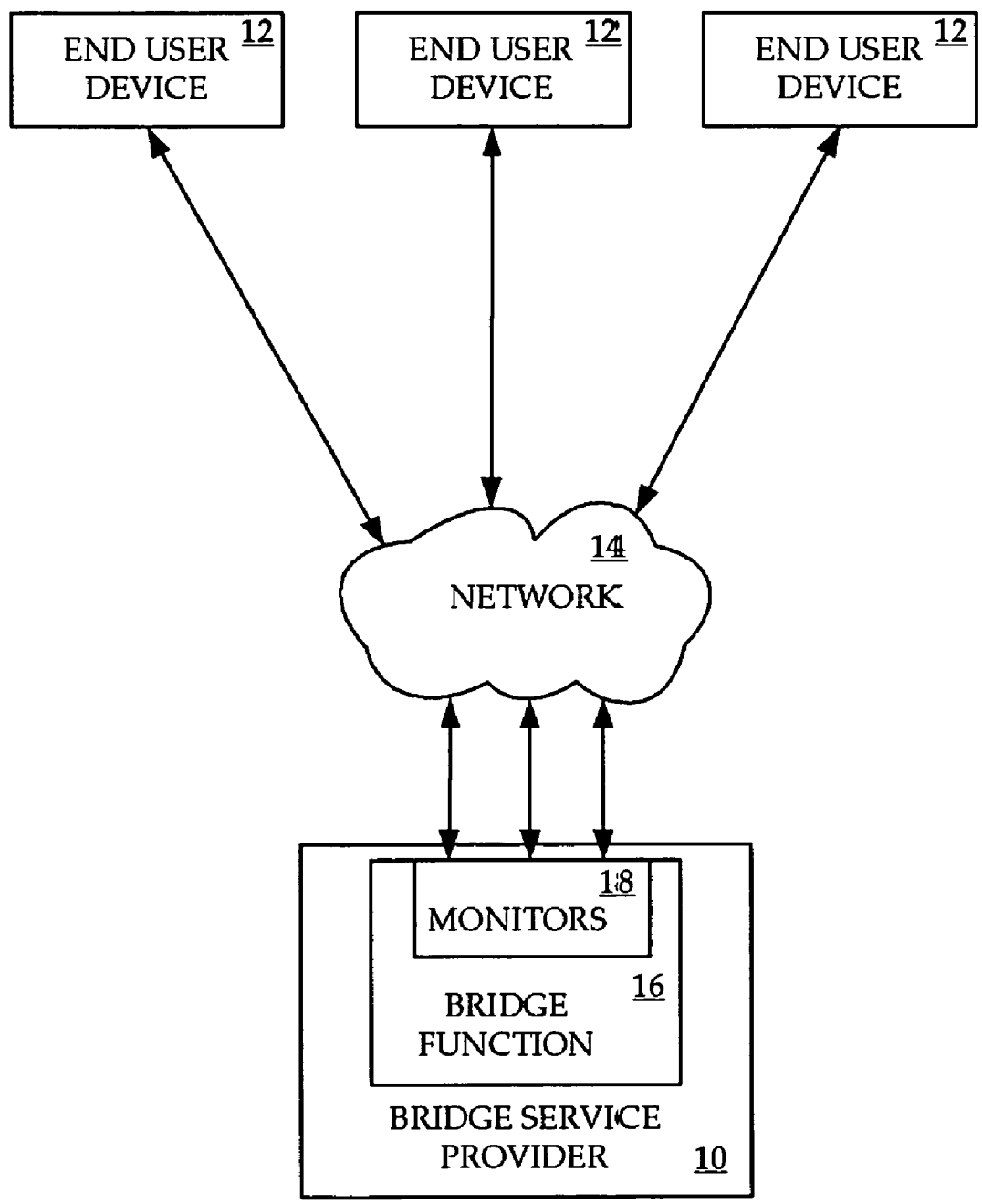
FIG. 1 is a block diagram of an example voice conference arrangement according to one embodiment of the invention.

Referring to FIG. 1, an example voice conference arrangement according to one embodiment of the invention is shown. A bridge service provider 10 provides voice conference bridging to a plurality of end user devices 12. The end user devices 12 connect through a telecommunications network 14 to a bridge function 16 maintained by the bridge service provider 10. Each end user device 12 transmits input signals through the network 14 to the bridge function 16. The bridge function 16 transmits at least one of the input signals or a combination of thereof to the other end user devices, the choice of which input signal or input signals to relay being dependent on the implementation of the bridge function. Each end user device 12 has a corresponding quality monitor 18 within the bridge function 16, the input signals from an end user device passing through the corresponding quality monitor. Each quality monitor 18 is a subset of instructions within the bridge function 16. In response to instructions from the quality monitor 18, other subsystems (not shown) within the bridge function 16 can provide in-band or out-of-band feedback signals to each end user device 12.

The network 14 may be any publicly accessible network. Alternatively, the bridge service provider 10, the network 14, and the end user devices 12 may be all part of the same organization and implemented on a private network, for example as a voice conferencing function in a corporate private branch exchange (PBX).

Broadly, in operation the bridge function monitors the quality of input signals from each end user device, and provides feedback information to any end user device for which the quality is unacceptable. If the quality is unacceptable because the unwanted content, such as hold tones, hold music, or excessive background noise, is detected, the bridge function may automatically mute input signals from the offending end user device.

Figure 2:
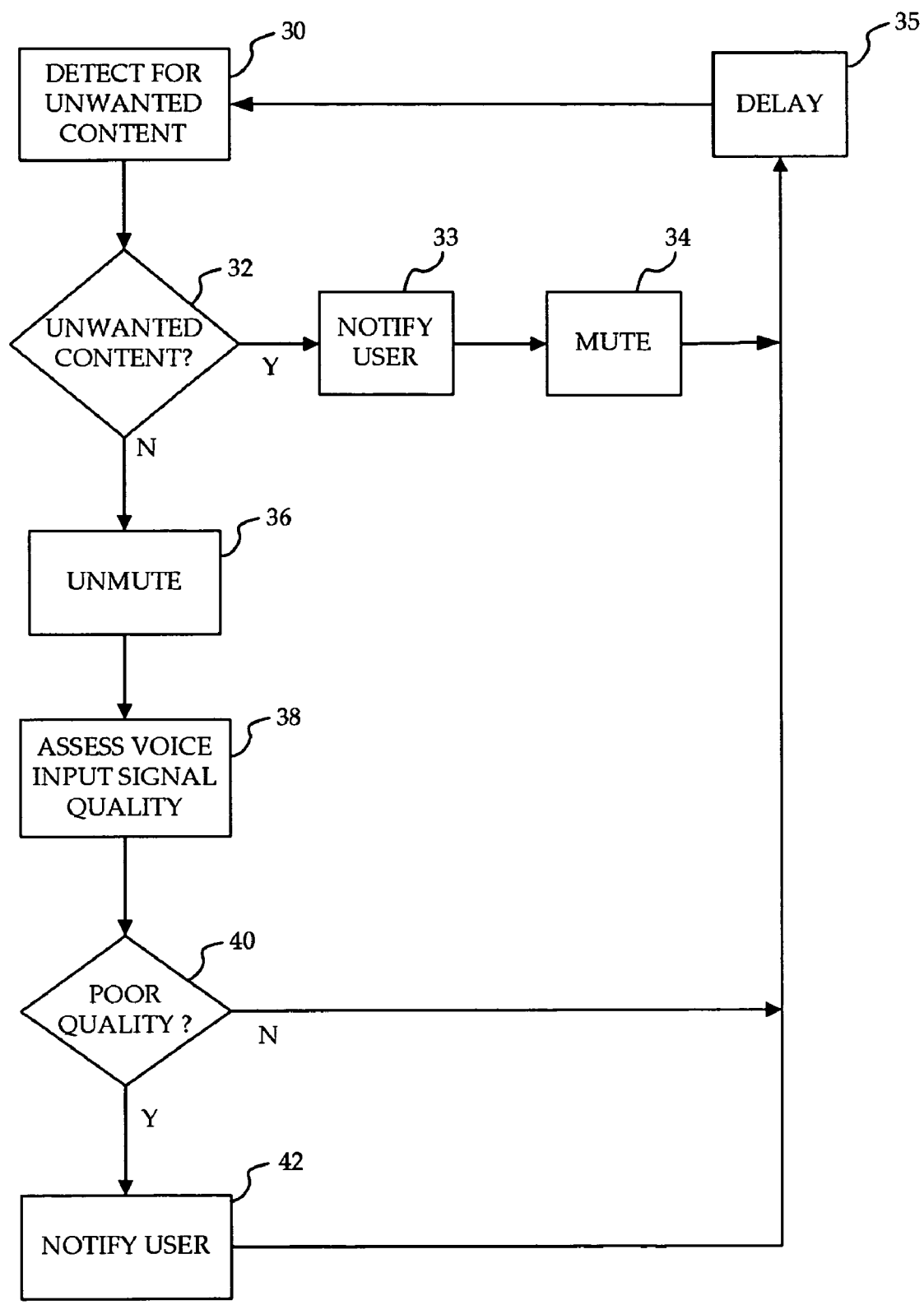
FIG. 2 is a flow chart of a method by which poor quality input is addressed by the voice bridge function according to one embodiment of the invention.

Referring to FIG. 2, a flow chart of a method by which the bridge function addresses poor quality input according to one embodiment of the invention is shown. For each end user device 12, the corresponding quality monitor 18 attempts to detect at step 30 whether the input signal includes unwanted content. Unwanted content is hold tones, hold music, and excessive background noise, or any subset of these. Hold tones may be detected by searching for cyclical tones using a spectral analysis of the input signal. Hold music may be detected by assessing the tonal qualities and voice energy levels in the input signal. Excessive background noise may be detected by similarly comparing voice energy levels with overall noise energy levels.

If at step 32 the quality monitor determines that the input signal includes unwanted content, then at step 33 the bridge function notifies the end user device that input from the end user device is about to be muted. The mute notification is sent in the form of an in-band voice message, or out-of-band messaging indicating to the user that the port has been muted. The mute notification may include a reason for the muting, and may include instructions on how the port may be unmuted by the user. At step 34 the quality monitor instructs the bridge function to mute the input signal from the end user device. The input signal is still received by the monitor, but the bridge function no longer forwards the input signal to other end user devices sharing the voice conference bridge. If the input signal is already muted, the muting is simply maintained. At step 35 the quality monitor pauses monitoring of the input signal from the end user device, in order to prevent repeated thrashing of the mute function. The loop formed by steps 30, 32, and 34 keeps the input signal muted until the unwanted content is no longer present in the input signal.

If the quality monitor determines at step 32 that the input signal did not contain unwanted content, then at step 36 the quality monitor instructs the bridge function to stop muting the input signal. A flag may be used by the quality monitor to track whether the input signal is currently being muted or not, in which case unnecessary mute and unmute instructions to the bridge function can be avoided.

The quality monitor assesses the voice quality of the input signal at step 38. The quality is a measure of how other participants in the voice conference perceive the input signal when relayed. Any combination of quality measures can be used to quantify the quality, such as input levels, signal to noise ratios, or low scores in Mean Opinion Score analysis. The quality monitor determines at step 40 whether the quality of the input signal is unacceptable by comparing the at least one quality measure with configured thresholds. As examples, the input signal may be found to be unacceptable if the input level is too low, if the input level is too high, or if the signal to noise ratio is too high.

If the quality monitor determines that the input signal has a quality which is unacceptable, then at step 42 the quality monitor generates a notification signal which the bridge provider relays only to the end user device which generated the poor quality input signal, and not to the remaining end user devices in the voice conference. The notification signal may be in-band or out-of-band. In-band signals may be in the form of pre-recorded messages indicating the problem and suggesting how to remedy the problem. For example, a voice message instructing users to "Speak up" may be generated by the bridge function and played through the offending end user device. Out-of-band signals allow the notification to be displayed in any of a number of ways, such as through a messaging system, on a display screen GUI, or on indicator lamps on the end user device.

Depending on the nature of the notification signal, the quality monitor may avoid sending the notification signal if another notification signal was sent recently, so as to avoid sending voice messages to the end user device in rapid succession.

Detection of the quality of an input signal may be performed in any of a number of ways. In addition to simply measuring input levels and signal to noise ratios, Mean Opinion Scores (MOS) can be used for Voice over IP (VOIP) voice conferences. MOS are described in ITU Recommendation P.800 and P.830. There are several commercially available tools for performing speech quality testing on VoIP calls. Psytechnics markets psyVoIP™, a hardware and software solution for use in IP phones and gateways. Agilent Technologies markets J6844A Telephony Network Analyzer™, which uses predictive MOS to rate call quality using non-intrusive measurements. Artizer VoIP Analyzer™ is a software solution for analyzing VoIP protocols, which provides ITU/ETSI Standard "R" Factor Passive QoS tests and predicted MOS score on a call-by-call basis. Empirix markets Hammer FX™ test platform for analyzing voice quality of VoIP applications including IP conferencing, provides Perceptual Evaluation of Speech Quality (PESQ) and MOS scores.

In the preferred embodiment, the methods implemented by the bridge function 16 and described above with reference to FIG. 2 are in the form of software within a processor, such as a digital signal processor which provides the voice bridge. More generally, instructions for implementing the method may be in the form of any combination of software or hardware, including hardware within an integrated circuit. The processor need not be a single device, but rather the instructions could be located in more than one device, including a distributed system.

The invention has been described with respect to a centralized voice conference system. Alternatively, if the voice conference system is a fully meshed system in which each end user device communicates with each of the other end user devices, then the methods of the invention are implemented on quality monitors located on each end user device. A quality monitor which detects unacceptable input singles from an end user sends notification signals to that end user device. In such an embodiment, the quality monitors are a subset of the software of processors responsible for implementing the meshed voice conference on each end user device.

The invention has been described as detecting for both unwanted content (such as cyclical hold tones, hold music, and excessive background noise) and for poor channel quality. Although both unwanted content and poor channel quality are examples of unacceptable input signals, the invention may be implemented by checking for only poor channel quality or for only unwanted content. Such embodiments simplify implementation of the invention, although the bridge function would then address a smaller range of problems causing unacceptable inputs to be injected into the bridge function.

The invention has been described as providing notification signals to the end user device if the quality of input signals received from the end user device is unacceptable. Alternatively, the bridge function could provide the end user device with a continuous indication of the quality of the input signals. In such an embodiment, the quality of the input signals could be displayed as a bar meter either on the end user device or on a separate GUI. Users of the end user device would then be able to improve the quality of the input signals in a more controlled manner, for example by sensing by how much speakers need to speak more clearly.

The embodiments presented are exemplary only and persons skilled in the art would appreciate that variations to the embodiments described above may be made without departing from the spirit of the invention. Methods that are logically equivalent or similar to the method described above with reference to FIG. 2 may be used to implement the methods of the invention. The scope of the invention is solely defined by the appended claims.

The invention claimed is:

1. A method of providing feedback to an end user device of a voice conference, comprising:
   measuring a quality of an input signal received from the end user device at a conference bridge;
   providing a notification signal to the end user device indicative of the quality of the input signal;
   displaying at the end user device an indication of the quality of the signal;

determining whether the input signal includes unwanted content; and when the input signal includes the unwanted content, providing a notification signal to the end user device indicating that the input signal will be muted, muting the input signal, and keeping in the input signal muted until the unwanted content is no longer present.

2. A computer-readable medium storing instructions for use in a conference bridge and for providing feedback to an end user device of a voice conference, the instructions comprising:

instructions for measuring a quality of an input signal received from the end user device at the conference bridge;

instructions for providing a notification signal to the end user device indicative of the quality of the input signal;

instructions for determining whether the input signal includes unwanted content;

instructions for providing a notification signal to the end user device indicating that the input signal will be muted when the input signal includes the unwanted content;

instructions for muting the input signal when the input signal includes the unwanted content; and instructions for keeping the input signal muted until the unwanted content is no longer present.

3. A method of providing feedback to an end user device of a voice conference, comprising:

measuring a quality of an input signal received from the end user device at a conference bridge;

determining whether the quality of the input signal is unacceptable by comparing the quality with configured thresholds;

if the quality of the input signal is unacceptable, providing a first notification signal to the end user device indicative of the quality of the input signal;

determining whether the input signal includes unwanted content; and when the input signal includes the unwanted content, providing a second notification signal to the end user device indicating that the input signal will be muted, muting the input signal, and keeping in the input signal muted until the unwanted content is no longer present.

4. The method of claim 3, wherein the first notification signal includes indications of how the quality of the input signal can be improved.

5. The method of claim 3, further comprising:
determining at least one of
whether an input level of the input signal is below a first threshold,
whether the input level is above a second threshold,
whether a signal to noise ratio of the input signal is above a third threshold, and
whether a Mean Opinion Score of the input signal is above a fourth threshold.

6. The method of claim 3, further comprising:
determining whether the input signal includes at least one of hold tones, hold music, and excessive background noise.

7. The method of claim 3, further comprising:
transmitting a warning to the end user device if the input signal is muted.

8. The method of claim 5, further comprising:
determining whether the input signal includes at least one of hold tones, hold music, and excessive background noise.

9. The method of claim 5, further comprising:
transmitting a warning to the end user device if the input signal is muted.

10. The method of claim 3, wherein the notification signal is an in-band voice message.

11. The method of claim 3, wherein the notification signal is an out-of-band signal for altering displays on the end user device.

12. The method of claim 3, further comprising:
when the user device is about to be muted, sending a mute notification message to the end user device, wherein the mute notification message comprises a reason for the muting and instructions on how a user may reverse the muting.

13. The method of claim 10, wherein the in-band voice message comprises a pre-recorded message that both indicates a problem in the input signal and suggests how to remedy the problem.

14. The method of claim 3, further comprising
providing the end user device with a continuous indication of the quality of the input signal.

15. The method of claim 14, further comprising:
displaying the indication of the quality of the signal as a bar meter on the end user device.

16. A computer-readable storage medium for use in a conference bridge and including instructions for providing feedback to an end user device of a voice conference, comprising:

instructions for measuring a quality of an input signal received from the end user device at the conference bridge;

instructions for determining whether the quality of the input signal is unacceptable by comparing the quality with configured thresholds;

instructions for providing a first notification signal to the end user device indicative of the quality of the input signal in the event that the quality of the input signal is unacceptable;

instructions for determining whether the input signal includes unwanted content;

instructions for providing a second notification signal to the end user device indicating that the input signal will be muted when the input signal includes the unwanted content;

instructions for muting the input signal when the input signal includes the unwanted content and instructions for keeping the input signal muted until the unwanted content is no longer present.

17. The computer-readable storage medium of claim 16, further comprising:
instructions for determining at least one of
whether an input level of the input signal is below a first threshold,
whether the input level is above a second threshold,
whether a signal to noise ratio of the input signal is above a third threshold, and
whether a Mean Opinion Score of the input signal is above a fourth threshold.

18. The computer-readable storage medium of claim 17, further comprising:
instructions for determining whether the input signal includes at least one of hold tones, hold music, and excessive background noise.

* * * * *